United States Patent
Ushida et al.

(10) Patent No.: US 11,764,654 B2
(45) Date of Patent: Sep. 19, 2023

(54) ROTARY ELECTRIC MACHINE MEMBER MANUFACTURING METHOD

(71) Applicant: AISIN CORPORATION, Kariya (JP)

(72) Inventors: Hideharu Ushida, Anjo (JP); Tetsuya Matsubara, Anjo (JP); Takehiro Anai, Anjo (JP)

(73) Assignee: AISIN CORPORATION, Kariya (JP)

( * ) Notice: Subject to any disclaimer, the term of this patent is extended or adjusted under 35 U.S.C. 154(b) by 948 days.

(21) Appl. No.: 16/478,210

(22) PCT Filed: Mar. 9, 2018

(86) PCT No.: PCT/JP2018/009353
§ 371 (c)(1),
(2) Date: Jul. 16, 2019

(87) PCT Pub. No.: WO2018/164277
PCT Pub. Date: Sep. 13, 2018

(65) Prior Publication Data
US 2019/0372440 A1    Dec. 5, 2019

(30) Foreign Application Priority Data

Mar. 9, 2017 (JP) .................. 2017-045337

(51) Int. Cl.
*H02K 15/03* (2006.01)
*B23K 26/28* (2014.01)
(Continued)

(52) U.S. Cl.
CPC ............. *H02K 15/03* (2013.01); *B23K 26/28* (2013.01); *H02K 1/276* (2013.01);
(Continued)

(58) Field of Classification Search
CPC ......... Y10T 29/49012; Y10T 29/49009; Y10T 29/4902; H02K 15/0012; H02K 1/26; H02K 15/02; H02K 15/03; B23K 26/28
(Continued)

(56) References Cited

U.S. PATENT DOCUMENTS

| 8,643,241 B2 * | 2/2014 | Kleber ................ H02K 17/165 310/212 |
| 8,698,371 B2 * | 4/2014 | Komada ................ H02K 1/28 310/216.004 |
| 2013/0106234 A1 | 5/2013 | Kagami et al. |

FOREIGN PATENT DOCUMENTS

| CN | 102639277 A | 8/2012 |
| JP | 54-158347 A | 12/1979 |

(Continued)

OTHER PUBLICATIONS

International Search Report for PCT/JP2018/009353 dated May 29, 2018 [PCT/ISA/210].

*Primary Examiner* — Thiem D Phan
(74) *Attorney, Agent, or Firm* — Sughrue Mion, PLLC (57) ABSTRACT

A rotary electric machine member manufacturing method includes: a step of providing a motor core by stacking a plurality of electromagnetic steel sheets; and a step of welding the motor core by keyhole welding while pressurizing the motor core in a stacking direction with a welding pressure lower than that at which the thickness of the motor core in the stacking direction levels off. The thickness is a length of the motor core between a first end of the motor core and a second end of the motor core.

13 Claims, 7 Drawing Sheets

(51) Int. Cl.
  *H02K 1/276* (2022.01)
  *B23K 101/36* (2006.01)
  *B23K 103/02* (2006.01)
(52) U.S. Cl.
  CPC ...... *B23K 2101/36* (2018.08); *B23K 2103/02* (2018.08); *Y10T 29/49012* (2015.01)
(58) Field of Classification Search
  USPC .................. 29/598, 596, 604, 609, 732, 738
  See application file for complete search history.

(56)         References Cited

FOREIGN PATENT DOCUMENTS

JP       2013-099047 A    5/2013
JP       2016-103882 A    6/2016

\* cited by examiner

ROTARY ELECTRIC MACHINE MEMBER MANUFACTURING METHOD

CROSS REFERENCE TO RELATED APPLICATIONS

This application is a National Stage of International Application No. PCT/JP2018/009353 filed Mar. 9, 2018, claiming priority based on Japanese Patent Application No. 2017-045337 Filed Mar. 9, 2017.

TECHNICAL FIELD

Aspects of the present application relate to rotary electric machine member manufacturing methods.

BACKGROUND ART

A rotary electric machine member manufacturing method including a step of welding a motor core is known in the related art. Such a rotary electric machine member manufacturing method is disclosed in, for example, Japanese Patent Application Publication No. 2016-103882 (JP 2016-103882 A).

JP 2016-103882 A discloses a rotor (rotary electric machine member) manufacturing method including a step of providing a rotor core (motor core) by stacking a plurality of electromagnetic steel sheets, and a step of welding an inner peripheral surface of the rotor core in a rotation axis direction of a rotor.

RELATED ART DOCUMENTS

Patent Documents

Patent Document 1: JP 2016-103882 A

SUMMARY OF THE APPLICATION

Problems Solved by Various Aspects of the Disclosure

When the rotor core is welded as described in JP 2016-103882 A, the temperature of welds increases during welding. This causes the welds to change from a room temperature state to an expanded state where the welds extend in the rotation axis direction of the rotor. The rotor core is thus welded, with the welds in the expanded state. Cooling the welds to a room temperature after welding causes the welds to contract from the expanded state, which occurs during welding, to the room temperature state such that the welds shrink in the rotation axis direction of the rotor. This produces tensile stress in the contracted welds. The tensile stress is a force that pulls the welds in a direction opposite to the direction of contraction of the welds. The direction of contraction of the welds corresponds to a direction in which the electromagnetic steel sheets move toward each other. The direction opposite to the direction of contraction of the welds is a direction in which the electromagnetic steel sheets move away from each other. Accordingly, continuously carrying out welding further applies tensile stress in addition to tensile stress remaining after welding, so that the resulting tensile stress gradually accumulates and increases. The resulting tensile stress may thus cause the welds to develop cracks extending along stacking surfaces of the electromagnetic steel sheets. A welding method that involves performing deep penetration welding with small energy (in particular, laser welding that involves making a keyhole so as to provide a molten pool and solidifying the molten pool) may induce occurrence of noticeable cracks because the time required from melting to solidification is short.

The aspects of the present application may solve the above-described problems, and an aspects of the present application provide a rotary electric machine member manufacturing method that is able to reduce the occurrence of cracks in welds caused by welding-induced tensile stress.

Means for Solving the Problem

To achieve these aspects, a rotary electric machine member manufacturing method according to an aspect of the present invention includes: a step of providing a motor core by stacking a plurality of electromagnetic steel sheets; and a step of welding the motor core by keyhole welding while pressurizing the motor core in a stacking direction with a welding pressure lower than that at which a thickness of the motor core in the stacking direction levels off. The thickness is a length of the motor core between a first end of the motor core and a second end of the motor core. As used herein, the expression "thickness levels off" refers to a situation where the thickness remains substantially unchanged and converges to a predetermined thickness if pressure is further applied.

As described above, the rotary electric machine member manufacturing method according to an aspect of the present application includes the step of welding the motor core by keyhole welding while pressurizing the motor core in the stacking direction with the welding pressure lower than that at which the thickness of the motor core in the stacking direction levels off. The thickness is the length of the motor core between the first end of the motor core and the second end of the motor core. The motor core is thus weldable, with a gap left between the electromagnetic steel sheets. In this case, the motor core is allowed to contract in a rotation axis direction (i.e., a direction in which adjacent ones of the electromagnetic steel sheets move toward each other) by the gap between the electromagnetic steel sheets. Accordingly, the motor core is contractible together with welds when the welds are cooled to a room temperature and contracted from an expanded state, which occurs during welding, to a room temperature state. This consequently makes it possible to reduce tensile stress, produced in the contracted welds in a direction in which the electromagnetic steel sheets move away from each other, in accordance with the extent to which the motor core is contractible, thus reducing the occurrence of cracks (which extend along stacking surfaces of the electromagnetic steel sheets) in the welds. These effects are highly advantageous in performing keyhole welding that is likely to reduce the tensile stress absorbing range and induce stress concentration because the amount of heat input and the melting range are small.

Effects of the Various Aspects

As described above, the present application provides a rotary electric machine member manufacturing method that is able to reduce the occurrence of cracks in welds caused by welding-induced tensile stress.

DETAILED DESCRIPTION OF THE VARIOUS EMBODIMENTS

Embodiments of the present application will be described below with reference to the drawings.

First Embodiment

Structure of Rotary Electric Machine

A structure of a rotary electric machine 100 (a rotor 20) according to a first embodiment will be described with reference to FIGS. 1 to 4.

As used herein, the term "rotation axis direction" refers to a direction extending along a rotation axis C of the rotor 20 (a rotor core 21) when the rotor 20 is in a completed state. The direction extending along the rotation axis C corresponds to a direction Z (see FIG. 1). As used herein, the term "peripheral direction" refers to a peripheral direction of the rotor 20 (the rotor core 21) when the rotor 20 is in the completed state. The peripheral direction of the rotor 20 corresponds to a direction B1 or a direction B2 (see FIG. 2). As used herein, the term "radially inward" refers to a direction radially toward a rotation center C0 of the rotor 20 (the rotor core 21) when the rotor 20 is in the completed state. The direction radially toward the rotation center C0 corresponds to, for example, a direction C1 (see FIG. 2). As used herein, the term "radially outward" refers to a direction radially away from the rotation center C0 of the rotor 20 (the rotor core 21) when the rotor 20 is in the completed state. The direction radially away from the rotation center C0 corresponds to, for example, a direction C2 (see FIG. 2).

Figure 1:
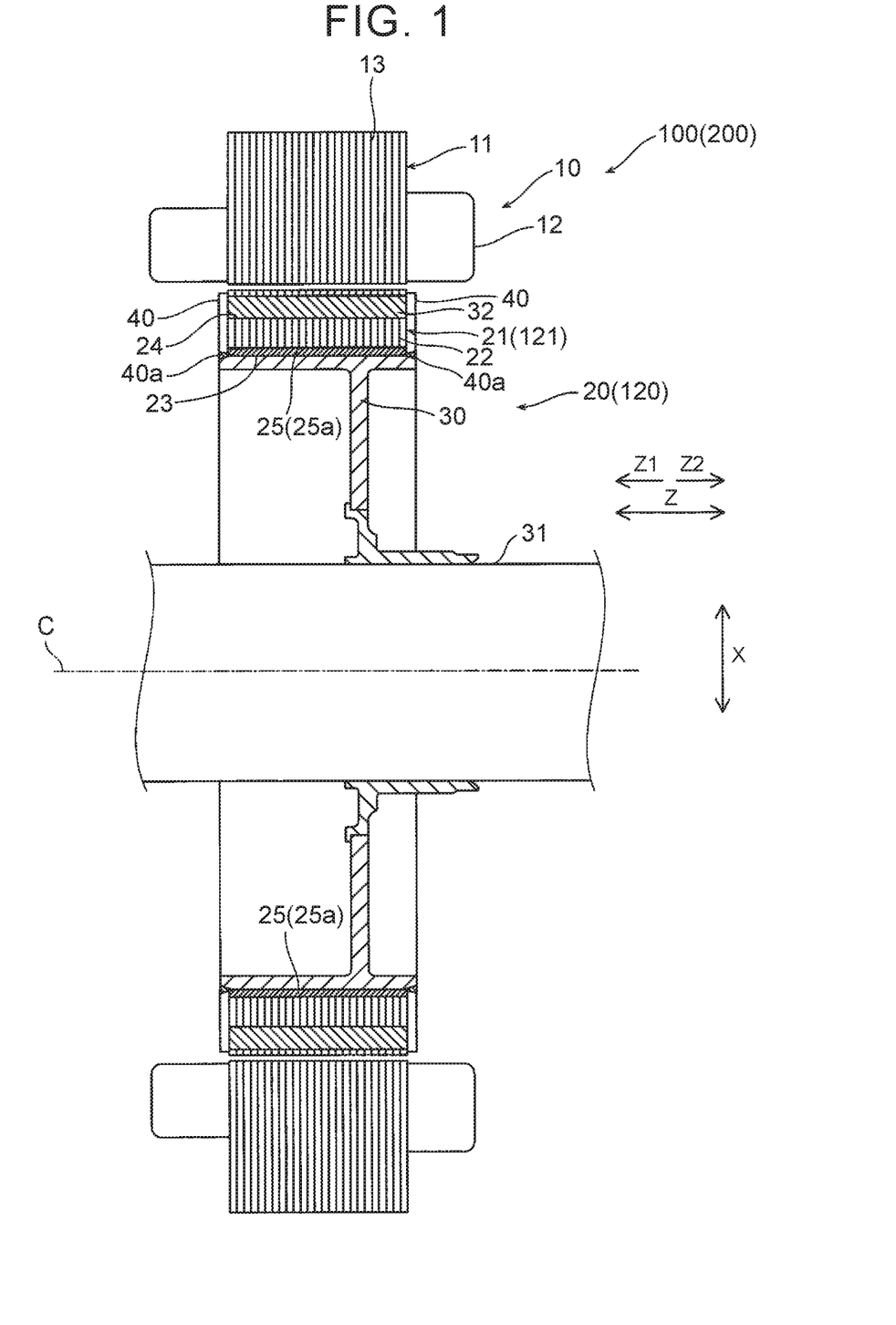
FIG. 1 is a cross-sectional view of a rotary electric machine according to first and second embodiments of the present application.

As illustrated in FIG. 1, the rotary electric machine 100 includes a stator 10 and the rotor 20. The rotor 20 is an example of a "rotary electric machine member" in the claims.

The stator 10 is a stator secured in the rotary electric machine 100. The stator 10 includes a stator core 11 and a winding 12 wound around the stator core 11. The stator core 11 includes a plurality of electromagnetic steel sheets 13. The stator core 11 is provided by stacking the electromagnetic steel sheets 13 in the rotation axis direction (i.e., the direction Z) in which the rotation axis C extends. The stator core 11 has a substantially annular shape.

The rotor 20 is a rotator rotatable around the rotation axis C. The rotor 20 includes a rotor core 21. The rotor core 21 has a substantially annular shape. The stator core 11 and the rotor core 21 of the rotary electric machine 100 are disposed to radially face each other. The rotor core 21 is an example of a "motor core" in the claims.

Figure 2:
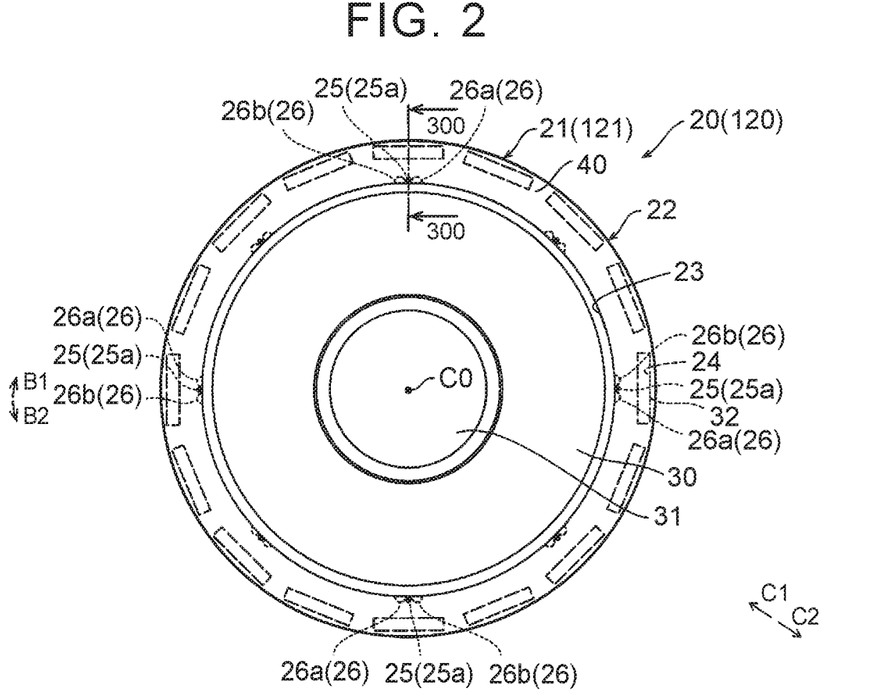
FIG. 2 is a diagram of a rotor according to the first and second embodiments of the present application, as viewed in a rotation axis direction (i.e., a direction Z).
Figure 3:
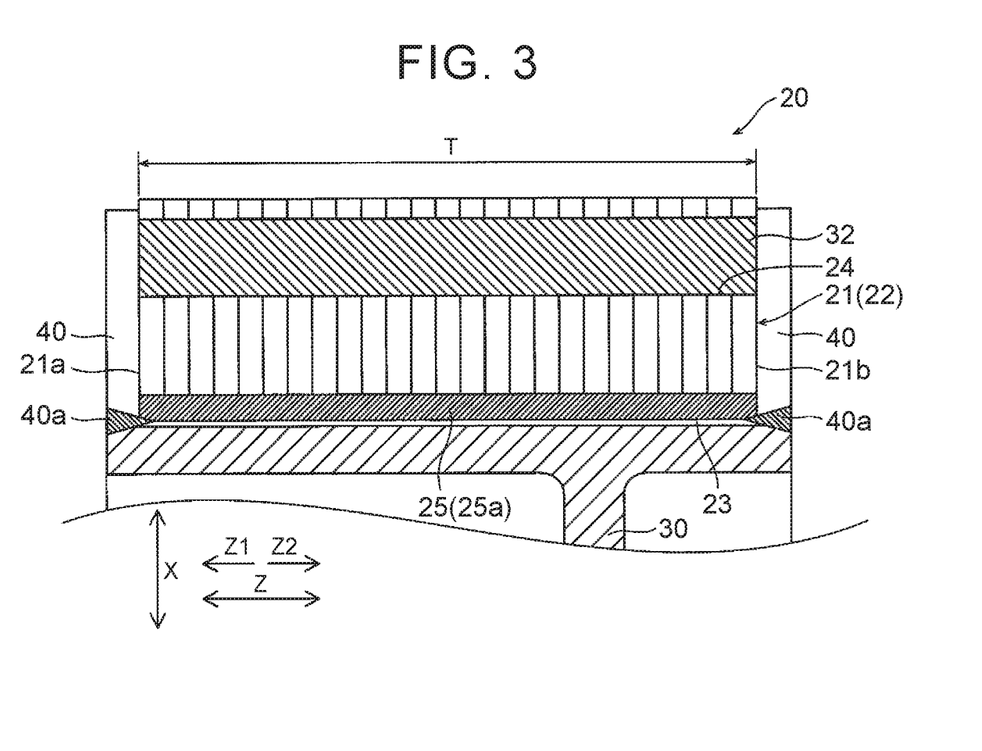
FIG. 3 is a cross-sectional view taken along a line 300-300 in FIG. 2.

As illustrated in FIGS. 1 to 3, the rotor core 21 includes a plurality of electromagnetic steel sheets 22. The rotor core 21 is provided by stacking the electromagnetic steel sheets 22 in the rotation axis direction (i.e., the direction Z). The rotor core 21 has a thickness T (see FIG. 3). The thickness T of the rotor core 21 is a length between a first end 21a of the rotor core 21 and a second end 21b of the rotor core 21 in the stacking direction of the electromagnetic steel sheets 22. The stacking direction corresponds to the direction Z. The first end 21a is an end of the rotor core 21 facing in a direction Z1 (see FIG. 3). The second end 21b is an end of the rotor core 21 facing in a direction Z2 (see FIG. 3). In the first embodiment, the thickness T of a radially outward portion of the rotor core 21 is a minimum thickness measured when no gaps are left between all of adjacent ones of the electromagnetic steel sheets 22. In other words, assuming that the thickness of the rotor core 21 decreases as a welding pressure applied thereto increases and the thickness of the rotor core 21 then converges to a certain thickness, the minimum thickness is the thickness of the rotor core 21 that has converged to the certain thickness by application of pressure thereto. A welding pressure at which the rotor core 21 has the minimum thickness is a welding pressure at which the thickness levels off. With the rotor 20 in the completed state, the radially outward portion of the rotor core 21 according to the first embodiment has no gaps between adjacent ones of the electromagnetic steel sheets 22. The radially outward portion of the rotor core 21 is located adjacent to magnet insertion holes 24. Although the rotor core 21 is illustrated in FIG. 3 as if a radially inward portion of the rotor core 21 also has no gaps between adjacent ones of the electromagnetic steel sheets 22, the radially inward portion of the rotor core 21 actually has slight gaps between adjacent ones of the electromagnetic steel sheets 22.

The rotor core 21 is provided with a through hole 23 whose center corresponds to the rotation center C0. A hub 30 is attached to the through hole 23 of the rotor core 21. A rotation shaft 31 is attached to the hub 30. The rotation shaft 31 is thus rotatable in response to rotation of the rotor core 21.

The rotor core 21 is provided with the magnet insertion holes 24 into which permanent magnets 32 are to be inserted. The magnet insertion holes 24 are through holes each extending from the first end 21a (see FIG. 3) of the rotor core 21 to the second end 21b (see FIG. 3) of the rotor core 21 in the rotation axis direction (i.e., the direction Z). The magnet insertion holes 24 are provided adjacent to an outer peripheral surface of the rotor core 21. The number of magnet insertion holes 24 is two or more (e.g., 16). The magnet insertion holes 24 are arranged at equiangular intervals in the peripheral direction. This means that the number of permanent magnets 32 inserted into the magnet insertion holes 24 is also two or more (e.g., 16), and the permanent magnets 32 are arranged at equiangular intervals in the peripheral direction. Similar to the magnet insertion holes 24, the permanent magnets 32 inserted into the magnet insertion holes 24 each extend from the first end 21a of the rotor core 21 to the second end 21b thereof (see FIG. 3) in the rotation axis direction. In the first embodiment, the permanent magnets 32 inserted into the magnet insertion holes 24 are secured with resin. Each of the permanent magnets 32 is an example of a "magnet" in the claims.

Figure 4:
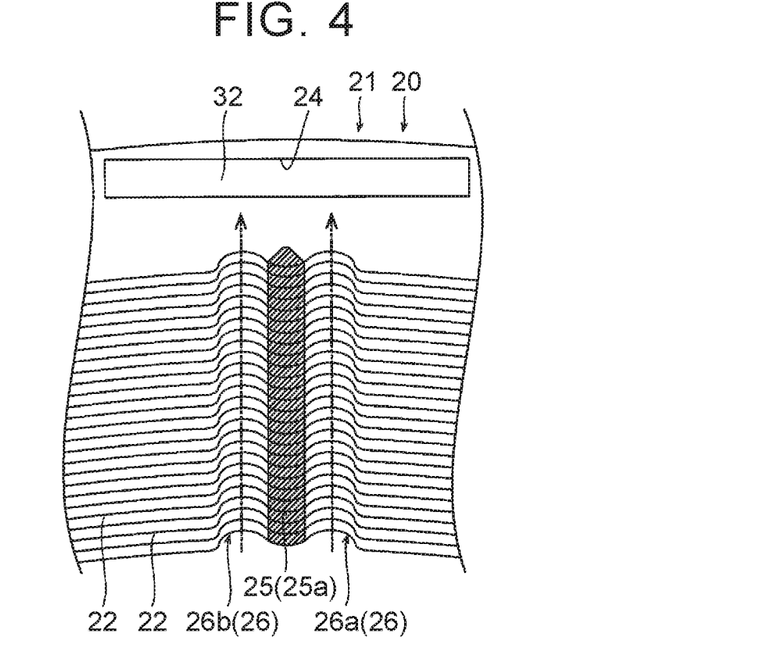
FIG. 4 is a perspective view of a weld of the rotor according to the first and second embodiments of the present application.

As illustrated in FIGS. 2 to 4, an inner peripheral surface of the rotor core 21 is provided with welding target portions 25. The welding target portions 25 are portions of the rotor core 21 to be subjected to welding (e.g., keyhole welding) using a high energy beam, such as a laser beam, in order to unify the electromagnetic steel sheets 22 of the rotor core 21. The welding target portions 25 each have a convex shape protruding radially inward (i.e., in the direction C1) as viewed in the rotation axis direction (i.e., the direction Z). Specifically, the welding target portions 25 gradually taper radially inward as viewed in the rotation axis direction. The welding target portions 25 are each formed so as to extend along the rotation axis direction (i.e., the direction Z) from the first end 21a of the rotor core 21 to the second end 21b of the rotor core 21 in the rotation axis direction. The first end 21a is the end of the rotor core 21 facing in the direction Z1 (see FIG. 3). The second end 21b is the end of the rotor core 21 facing in the direction Z2 (see FIG. 3). The number of welding target portions 25 is two or more (e.g., eight). The welding target portions 25 are arranged at equiangular intervals in the peripheral direction. As used herein, the term "keyhole" refers to a circular hole defined by applying high-density energy, such as laser, to a portion to be welded. As used herein, the term "keyhole welding" refers to a welding technique that involves providing a molten pool around a keyhole and solidifying the molten pool provided. Examples of such a welding technique include not only laser welding but also electron beam welding. "Keyhole welding" enables deep penetration welding with small energy.

The welding target portions 25 are each provided with a weld 25a. The welds 25a are welding marks made in the welding target portions 25 during welding of the rotor core 21. Similar to the welding target portions 25, the welds 25a are each formed so as to extend along the rotation axis direction from the first end 21a of the rotor core 21 to the second end 21b of the rotor core 21 in the rotation axis direction. This means that the rotor core 21 is welded from the first end 21a to the second end 21b in the rotation axis direction. In other words, all of the electromagnetic steel sheets 22 of the rotor core 21 are unified by welding. Each of the welding target portions 25 (or each of the welds 25a) is disposed to radially overlap with an associated one of the magnet insertion holes 24 (or an associated one of the permanent magnets 32).

The inner peripheral surface of the rotor core 21 is provided with cooling fluid passages 26. The cooling fluid passages 26 are passages through which a cooling fluid, such as oil, flows to cool the rotor 20. In FIG. 4, the thick long dashed double-short dashed lines indicate how the cooling fluid flows. The cooling fluid passages 26 each have a concave shape recessed radially outward (i.e., in the direction C2) as viewed in the rotation axis direction (i.e., the direction Z). The cooling fluid passages 26 each gradually taper radially outward as viewed in the rotation axis direction. The cooling fluid passages 26 are each formed so as to extend along the rotation axis direction (i.e., the direction Z) from the first end 21a (see FIG. 3) of the rotor core 21 to the second end 21b (see FIG. 3) of the rotor core 21 in the rotation axis direction. The number of cooling fluid passages 26 is two or more (e.g., eight). The cooling fluid passages 26 are arranged at equiangular intervals in the peripheral direction.

The cooling fluid passages 26 are each disposed adjacent to an associated one of the welding target portions 25. Specifically, the cooling fluid passages 26 each include a first passage 26a and a second passage 26b. The first passage 26a is adjacent to the associated welding target portion 25 such that the first passage 26a is located on a first side relative to the associated welding target portion 25 in the peripheral direction. The second passage 26b is adjacent to the associated welding target portion 25 such that the second passage 26b is located on a second side relative to the associated welding target portion 25 in the peripheral direction. Each welding target portion 25 is sandwiched between the first passage 26a and the second passage 26b of the associated cooling fluid passage 26 in the peripheral direction. Each welding target portion 25 defines a portion of the associated cooling fluid passage 26.

As illustrated in FIGS. 1 to 3, the rotor 20 includes substantially annular end plates 40 each disposed on an associated one of the first end 21a and the second end 21b of the rotor core 21 in the rotation axis direction. The end plates 40 are structured to support the rotor core 21 from both sides in the rotation axis direction. The end plates 40 of the rotor 20 are welded, together with the hub 30, to the inner peripheral surface of the rotor core 21 through welds 40a.

Rotor Manufacturing Method

A method for manufacturing the rotor 20 according to the first embodiment will be described below with reference to FIGS. 5 to 7.

Figure 5:
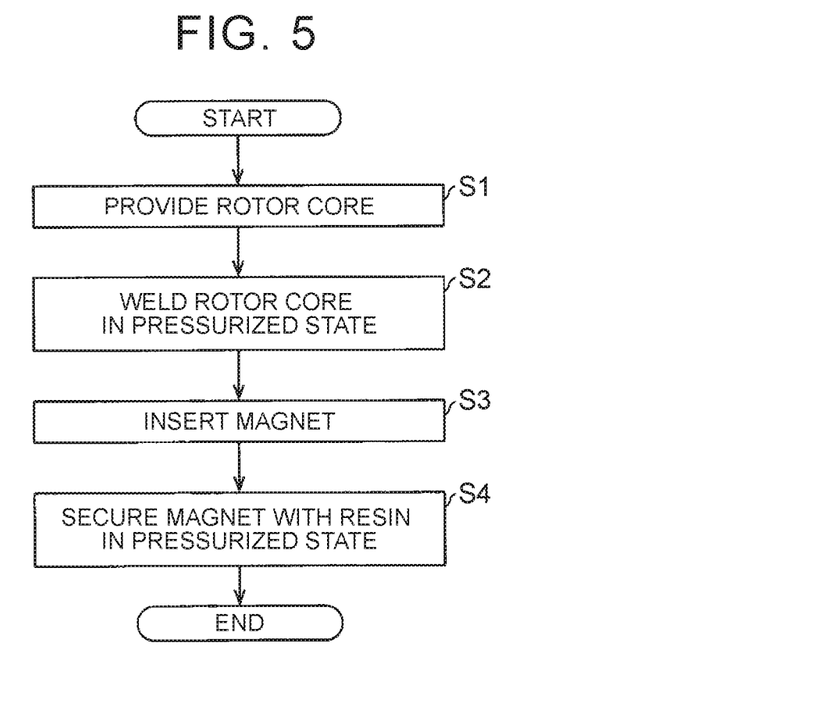
FIG. 5 is a flow chart illustrating a rotor manufacturing method according to the first embodiment of the present application.

As illustrated in FIG. 5, the first step is step 51 involving stacking the electromagnetic steel sheets 22, each having an annular shape, in the rotation axis direction. This provides the rotor core 21 including the through hole 23 whose center corresponds to the rotation center C0.

Then, step S2 involves welding the rotor core 21 while pressurizing the rotor core 21 in the rotation axis direction (i.e., the direction Z).

In the first embodiment, step S2 involves welding the rotor core 21 by keyhole welding while pressurizing (or pressing) the rotor core 21 in the stacking direction with a welding pressure (or load) lower than a welding pressure (or load) at which the thickness T of the rotor core 21 levels off. In the step of welding the rotor core 21, the rotor core 21 is welded, with gaps D left between adjacent ones of the electromagnetic steel sheets 22 as illustrated in FIGS. 6 and 7. The thickness T of the rotor core 21 during welding is, for example, the product of the minimum thickness and a factor of 1.003 to 1.007 inclusive. When the minimum thickness is 60 mm, for example, the thickness T of the rotor core 21 during welding is between 60.2 mm and 60.4 mm inclusive. In FIGS. 6 and 7, the gaps D are left between all of adjacent ones of the electromagnetic steel sheets 22 of the rotor core 21. The rotor core 21, however, does not necessarily have to be such that the gaps D are left between all of adjacent ones of the electromagnetic steel sheets 22. Alternatively, the rotor core 21 may be such that the gaps D are left between some of adjacent ones of the electromagnetic steel sheets 22. The step of "welding the rotor core 21 while pressurizing (or pressing) the rotor core 21 in the stacking direction with a welding pressure (or load) lower than a welding pressure (or load) at which the thickness T of the rotor core 21 levels off" includes not only welding the rotor core 21 while pressurizing the rotor core 21 in the stacking direction with a welding pressure lower than that at which the thickness T actually levels off, but also welding the rotor core 21 while the distance between a pair of pressurizers (of a pressing punch) to pressurize the rotor core 21 is slightly increased such that the resulting thickness T will be slightly larger than the thickness T (i.e., the minimum thickness) that levels off.

Specifically, step S2 involves welding the rotor core 21 while pressurizing the rotor core 21, having the gaps D between adjacent ones of the electromagnetic steel sheets 22, with a predetermined welding pressure at which the rotor core 21 has the predetermined thickness T larger than the minimum thickness. The predetermined welding pressure is lower than a welding pressure at which the rotor core 21 has the minimum thickness. The welding pressure at which the rotor core 21 has the minimum thickness is 20 kN or more, for example. The predetermined welding pressure is 1 kN, for example.

In other words, step S2 involves welding the rotor core 21 while pressurizing the rotor core 21 having the gaps D between adjacent ones of the electromagnetic steel sheets 22, such that the gaps D will be left between adjacent ones of the electromagnetic steel sheets 22. Accordingly, the rotor core 21 has the gaps D between adjacent ones of the electromagnetic steel sheets 22 both before and after welding as illustrated in FIG. 7. The gaps D between adjacent ones of the electromagnetic steel sheets 22 after welding are slightly smaller in size than the gaps D between adjacent ones of the electromagnetic steel sheets 22 before welding.

The predetermined welding pressure is a welding pressure to pressurize the rotor core 21 such that the density of the rotor core 21 is equal to or higher than the density of the stator core 11. Accordingly, the rotor core 21 is welded in step S2 such that the rotor core 21 has the thickness T at which the density of the rotor core 21 is equal to or higher than the density of the stator core 11. The density of the rotor core 21 (or the stator core 11) is calculated by dividing the mass of the rotor core 21 (or the stator core 11) by the volume of the rotor core 21 (or the stator core 11). Thus, assuming that the number of electromagnetic steel sheets 22 (or the electromagnetic steel sheets 13) included in the rotor core 21 (or the stator core 11) remains unchanged, the density of the rotor core 21 (or the stator core 11) decreases as the thickness T of the rotor core 21 (or the stator core 11) increases. When the thickness of the rotor core 21 (or the stator core 11) is the minimum thickness, the density of the rotor core 21 (or the stator core 11) is maximized.

Figure 6:
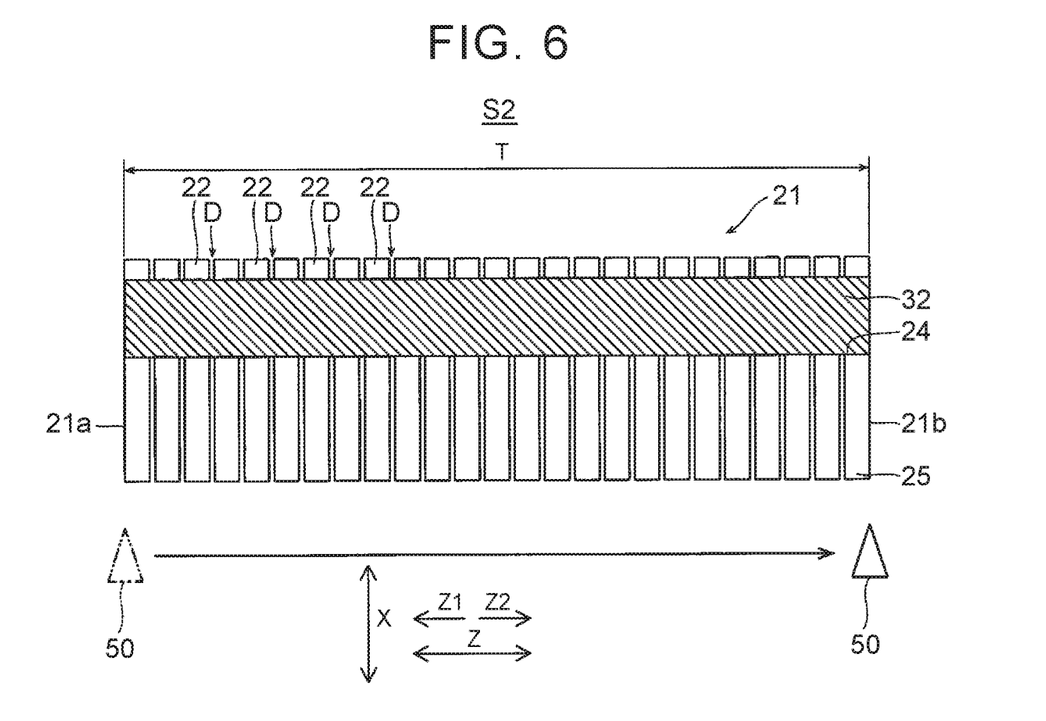
FIG. 6 is a diagram illustrating how a rotor core is welded in step S2 in FIG. 5.
Figure 7:
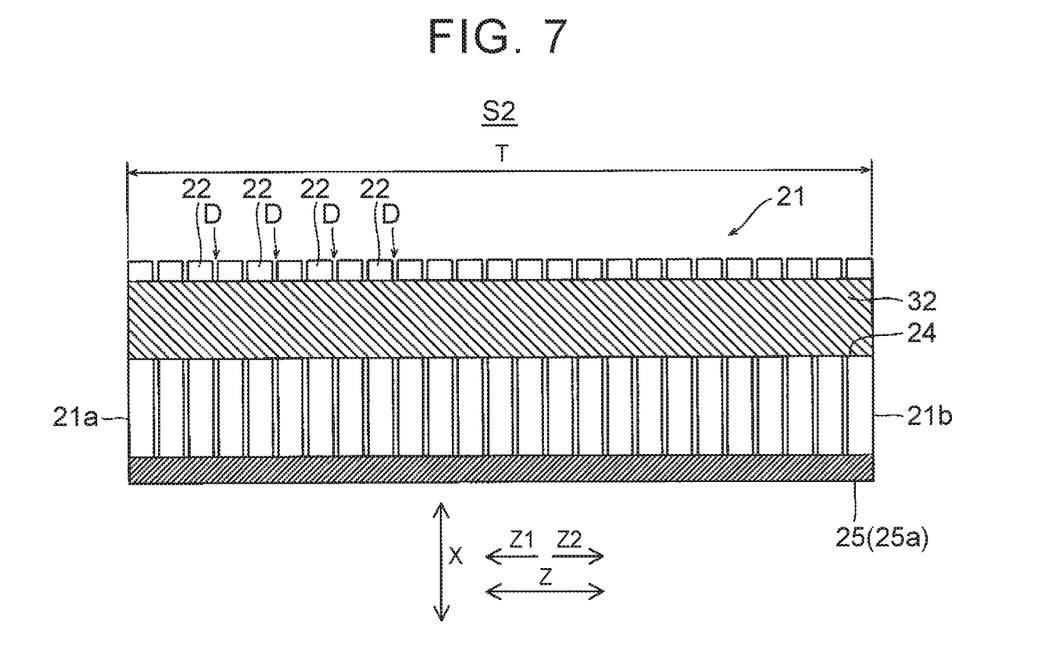
FIG. 7 is a diagram illustrating the rotor core that has been welded in step S2 in FIG. 5.

As illustrated in FIG. 6, the first embodiment involves moving a welding head 50 relative to the welding target portions 25 of the rotor core 21 while outputting a high energy beam from the welding head 50. The rotor core 21 is thus subjected to welding (e.g., keyhole welding) from the first end 21a of the rotor core 21 to the second end 21b thereof in the rotation axis direction. This provides the welds 25a in the welding target portions 25. The welding target portions 25, the number of which is eight in total, are not welded simultaneously but welded sequentially on a one-by-one basis.

Then, step S3 involves inserting (or press-fitting) each permanent magnet 32 into an associated one of the magnet insertion holes 24 of the rotor core 21.

Subsequently, step S4 involves injecting resin into the magnet insertion holes 24 of the rotor core 21, with the rotor core 21 pressurized in the rotation axis direction (i.e., the direction Z). The permanent magnets 32 inserted into the magnet insertion holes 24 of the rotor core 21 are thus secured with the resin. In step S4, the permanent magnets 32 inserted into the magnet insertion holes 24 of the rotor core 21 are secured with the resin, with the rotor core 21 pressurized with a welding pressure (e.g., a welding pressure of 250 kN) at which the rotor core 21 has the minimum thickness. In other words, step S4 involves securing, with the resin, the permanent magnets 32 inserted into the magnet insertion holes 24 of the rotor core 21 while pressurizing the rotor core 21 (which has the gaps D between adjacent ones of the electromagnetic steel sheets 22 after welding) such that no gaps D are left between adjacent ones of the electromagnetic steel sheets 22. In step S4, the radially outward portion of the rotor core 21 (adjacent to the magnet insertion holes 24) is pressurized, so that no gaps D are left between adjacent ones of the electromagnetic steel sheets 22 at least in the radially outward portion of the rotor core 21 (adjacent to the magnet insertion holes 24). The gaps D, however, are slightly left between the electromagnetic steel sheets 22 in the radially inward portion of the rotor core 21. The end plates 40 and the hub 30 are then disposed at predetermined weldable locations and welded to the inner peripheral surface of the rotor core 21. This results in completion of the rotor 20.

Second Embodiment

Figure 8:
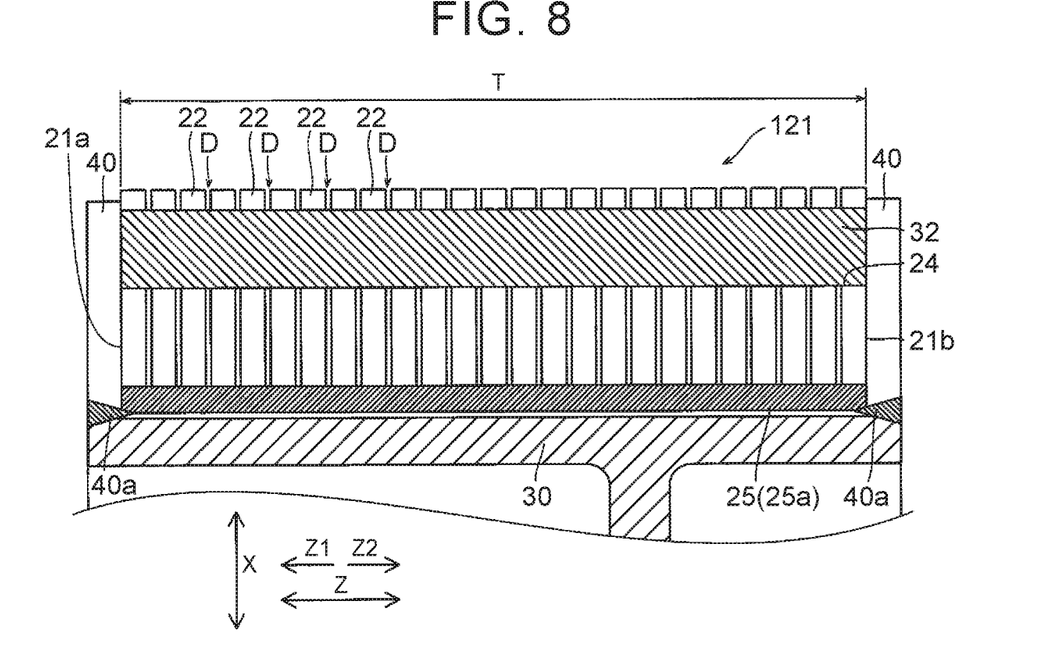
FIG. 8 is an enlarged cross-sectional view of the rotary electric machine according to the second embodiment of the present application.

A second embodiment will be described below with reference to FIGS. 8 and 9. In the second embodiment, a rotor core of a rotor in a completed state has gaps between adjacent ones of electromagnetic steel sheets unlike the first embodiment.

A rotary electric machine 200 according to the second embodiment of the present application differs from the rotary electric machine 100 according to the first embodiment in that the rotary electric machine 200 includes a rotor 120. As illustrated in FIG. 8, the rotor 120 according to the second embodiment of the present application differs from the rotor 20 according to the first embodiment in that the rotor 120 includes a rotor core 121.

In the second embodiment, the thickness T of the rotor core 121 is larger than the minimum thickness. Specifically, the rotor core 121 according to the second embodiment has the gaps D between adjacent ones of the electromagnetic steel sheets 22 as illustrated in FIG. 8, with the rotor 120 in the completed state. In the second embodiment, the permanent magnets 32 inserted into the magnet insertion holes 24 are secured with an adhesive.

The configuration of the second embodiment other than those described above are similar to the configuration of the first embodiment.

Rotor Manufacturing Method

A method for manufacturing the rotor 120 according to the second embodiment will be described below with reference to FIG. 9.

Figure 9:
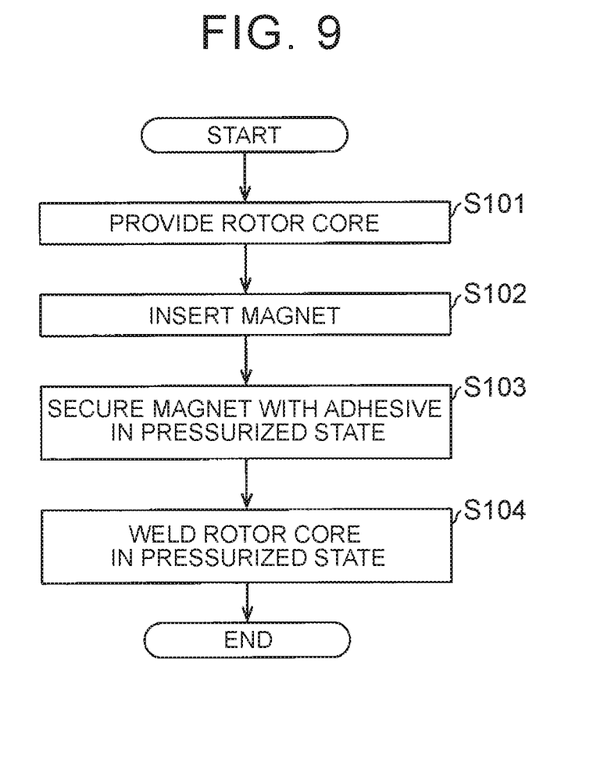
FIG. 9 is a flow chart illustrating a rotor manufacturing method according to the second embodiment of the present application.

As illustrated in FIG. 9, the first step is step S101 involving stacking the electromagnetic steel sheets 22, each having an annular shape, in the rotation axis direction. This provides the rotor core 121 including the through hole 23 whose center corresponds to the rotation center C0.

Then, step S102 involves inserting (or press-fitting) each permanent magnet 32 into an associated one of the magnet insertion holes 24 of the rotor core 121. In the second embodiment, step S102 involves applying an adhesive to the permanent magnets 32, drying the adhesive, and then inserting the permanent magnets 32 into an associated one of the magnet insertion holes 24 of the rotor core 121.

Subsequently, step S103 involves securing, with the adhesive, the permanent magnets 32 inserted into the magnet insertion holes 24 of the rotor core 121 while pressurizing the rotor core 121 in the rotation axis direction (i.e., the direction Z). In the second embodiment, step S103 involves securing, with the adhesive, the permanent magnets 32 inserted into the magnet insertion holes 24 of the rotor core 121 while pressurizing the rotor core 121, having the gaps D between adjacent ones of the electromagnetic steel sheets 22, with a welding pressure lower than that at which the rotor core 121 has the minimum thickness. In other words, step S103 involves securing, with the adhesive, the permanent magnets 32 inserted into the magnet insertion holes 24 of the rotor core 121 while pressurizing the rotor core 121 having the gaps D between adjacent ones of the electromagnetic steel sheets 22, such that the gaps D will be left between adjacent ones of the electromagnetic steel sheets 22. The welding pressure applied during the securing of the magnets may be equal to or higher than a welding pressure to be applied during welding in step S104 as long as the welding pressure applied during the securing of the magnets does not cause the rotor core 121 to have the minimum thickness.

Similar to step S2 in the first embodiment, step S104 involves welding the rotor core 121 while pressurizing the rotor core 121 in the rotation axis direction (i.e., the direction Z). Because step S104 is similar to step S2, detailed description of step S104 will be omitted. The end plates 40 and the hub 30 are then disposed at predetermined weldable locations and welded to the inner peripheral surface of the rotor core 21. This results in completion of the rotor 120.

Effects of First and Second Embodiments

The first and second embodiments achieve effects described below.

Figure 10A:
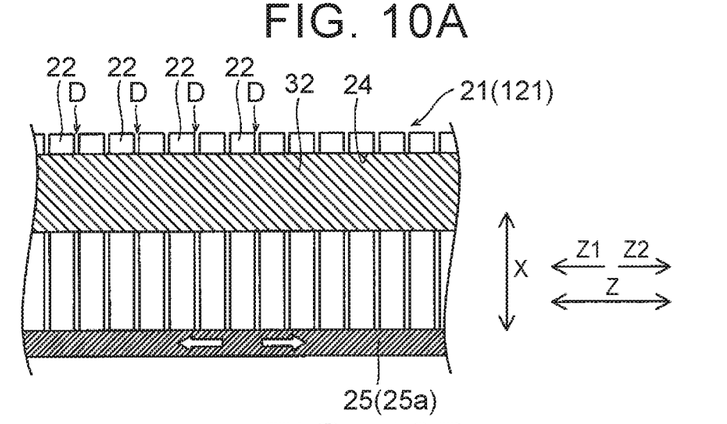
FIG. 10A is a diagram illustrating tensile stress produced in the weld of the rotor core that is welded, with gaps left between electromagnetic steel sheets.
Figure 10B:
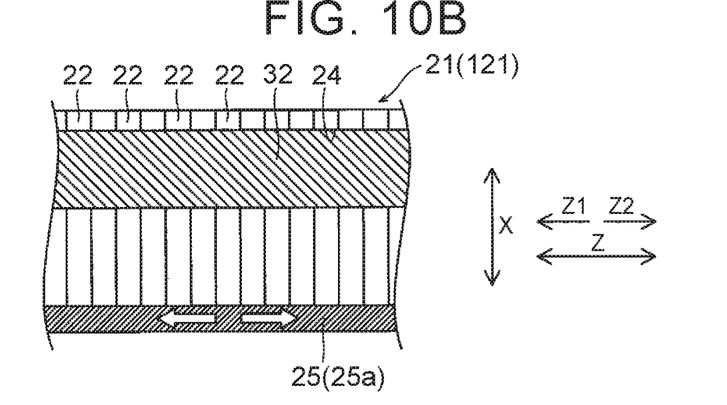
FIG. 10B is a diagram illustrating tensile stress produced in the weld of the rotor core that is welded, with no gaps left between the electromagnetic steel sheets.

As described above, the method for manufacturing the rotor (20, 120) according to the first and second embodiments includes the step of welding the rotor core (21, 121) by keyhole welding while pressurizing the rotor core (21, 121) in the stacking direction with a welding pressure lower than that at which the thickness (T) of the rotor core (21, 121) in the stacking direction levels off. The thickness (T) is the length of the rotor core (21, 121) between the end on the first side (the first end (21a)) of the rotor core (21, 121) and the end on the second side (the second end (21b)) of the rotor core (21, 121). The first and second embodiments thus make it possible to weld the rotor core (21, 121), with the gaps (D) left between the electromagnetic steel sheets (22) as illustrated in FIG. 10A. In this case, unlike the case where the rotor core (21, 121) is welded, with no gaps (D) left between the electromagnetic steel sheets (22) as illustrated in FIG. 10B, the rotor core (21, 121) is allowed to contract in the rotation axis direction (i.e., the direction in which adjacent ones of the electromagnetic steel sheets move toward each other) by the gaps (D) between adjacent ones of the electromagnetic steel sheets 22. Accordingly, the rotor core (21, 121) is contractible together with the welds (25a) when the welds (25a) are cooled to a room temperature and contracted from an expanded state, which occurs during welding, to a room temperature state. This makes it possible to reduce tensile stress in the contracted welds (25a) in accordance with the extent to which the rotor core (21, 121) is contractible, thus reducing the occurrence of cracks (which extend along the stacking surfaces of the electromagnetic steel sheets (22) of the rotor (20, 120)) in the welds (25a). In FIGS. 10A and 10B, the tensile stress produced in the welds 25a is schematically indicated by the white arrows. These effects are highly advantageous in performing keyhole welding that is likely to reduce the tensile stress absorbing range and induce stress concentration because the amount of heat input and the melting range are small.

In the first and second embodiments, the step of welding the rotor core (21, 121) involves, as described above, welding the rotor core (21, 121) while pressurizing the rotor core (21, 121), having the gaps (D) between adjacent ones of the electromagnetic steel sheets (22), with a welding pressure lower than that at which the rotor core (21, 121) has the minimum thickness. This makes it possible to weld the rotor core (21, 121), with the gaps (D) left between adjacent ones of the electromagnetic steel sheets (22), while suitably reducing the thickness (T) of the rotor core (21, 121) by applying pressure thereto. If the rotor core (21, 121) is not pressurized, the thickness (T) of the rotor core (21, 121) will not be sufficiently small, so that the density of the rotor core (21, 121) will not be sufficiently high. This may degrade the performance (such as torque characteristics) of the rotary electric machine (100, 200) including the rotor core (21, 121). Accordingly, the above-described step makes it possible to reduce the occurrence of cracks in the welds (25a) of the rotor core (21, 121) while suppressing degradation in the performance of the rotary electric machine (100, 200) including the rotor core (21, 121), which is caused by making the thickness (T) of the rotor core (21, 121) larger than the minimum thickness.

As described above, the method for manufacturing the rotor (20) according to the first embodiment includes, after the step of welding the rotor core (21), the step of securing, with resin, the permanent magnets (32) inserted into the magnet insertion holes (24) of the rotor core (21) while pressurizing the rotor core (21) with a welding pressure at which the rotor core (21) has the minimum thickness. Thus, the step of welding the rotor core (21) involves welding the rotor core (21), with the gaps (D) left between adjacent ones of the electromagnetic steel sheets (22), so as to reduce the occurrence of cracks in the welds (25a) of the rotor core (21), and the step of securing the permanent magnets (32) with the resin after the step of welding the rotor core (21) involves pressurizing the rotor core (21) with a welding pressure at which the rotor core (21) has the minimum thickness so as to leave no gaps (D) between adjacent ones of the electromagnetic steel sheets (22). This consequently makes it possible to suppress the resin from entering the gaps (D) between adjacent ones of the electromagnetic steel sheets (22) during the step of securing the permanent magnets (32) with the resin, and to suppress degradation in the performance of the rotary electric machine (100) including the rotor core (21), which is caused by making the thickness (T) of the rotor core (21) larger than the minimum thickness.

As described above, the method for manufacturing the rotor (120) according to the second embodiment includes, before the step of welding the rotor core (121), the step of securing, with an adhesive, the permanent magnets (32) inserted into the magnet insertion holes (24) of the rotor core (121) while pressurizing the rotor core (121), having the gaps (D) between the electromagnetic steel sheets (22), with a welding pressure lower than that at which the rotor core (121) has the minimum thickness (T). Thus, if the step of securing the permanent magnets (32) is performed before the step of welding the rotor core (121), the gaps (D) would be left between adjacent ones of the electromagnetic steel sheets (22) during the step of securing the permanent magnets (32). This makes it possible to weld the rotor core (121), with the gaps (D) left between adjacent ones of the electromagnetic steel sheets (22) during the step of welding the rotor core (121).

In the first and second embodiments, the step of welding the rotor core (21, 121) involves, as described above, welding the rotor core (21, 121) such that the rotor core (21, 121) has the thickness (T) at which the density of the rotor core (21, 121) is equal to or higher than the density of the stator core (11) facing the rotor core (21, 121). Thus, the density of the rotor core (21, 121) will not be lower than the density of the stator core (11) in the rotary electric machine (100, 200) including the rotor core (21, 121) and the stator core 11. Consequently, if the rotor core (21, 121) is welded, with the thickness (T) of the rotor core (21, 121) increased beyond the minimum thickness, the first and second embodiments would make it possible to suppress degradation in the performance of the rotary electric machine (100, 200) including the rotor core (21, 121) and the stator core (11), which is caused by the thickness (T) of the rotor core (21, 121).

Figure 11A:
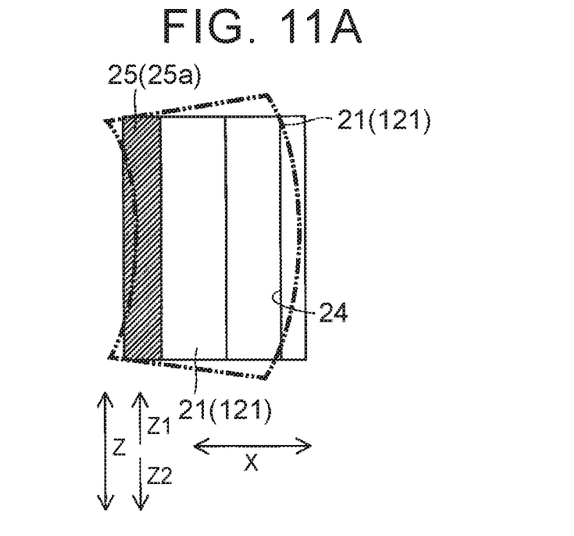
FIG. 11A is a diagram illustrating welding-induced deformation of the rotor core that is welded, with no magnets inserted into magnet insertion holes.
Figure 11B:
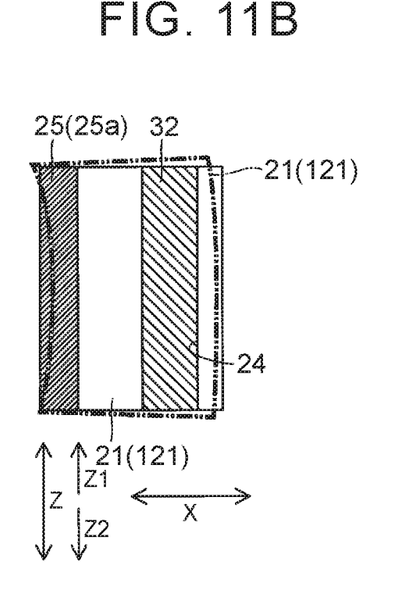
FIG. 11B is a diagram illustrating welding-induced deformation of the rotor core that is welded, with the magnets inserted into the magnet insertion holes.

As described above, the method for manufacturing the rotor (20, 120) according to the second embodiment includes, before the step of welding the rotor core (21, 121), the step of inserting the permanent magnets (32) into the magnet insertion holes (24) of the rotor core (21, 121). As illustrated in FIGS. 11A and 11B, welding the rotor core (21, 121) induces the contraction of the welds (25a), causing the rotor core (21, 121) to deform in accordance with the contraction of the welds (25a). To cope with this, welding may be performed, with the permanent magnets (32) inserted into the magnet insertion holes (24) as described above (i.e., in the manner illustrated in FIG. 11B). In this case, because the permanent magnets (32) are inserted into the magnet insertion holes (24) of the rotor core (21, 121), the deformation of the rotor core (21, 121) responsive to the contraction of the welds (25a) will be smaller than when the rotor core (21, 121) is welded, with no permanent magnets (32) inserted into the magnet insertion holes (24) of the rotor core (21, 121) as illustrated in FIG. 11A. This results in a reduction in the amount of deformation of the rotor core (21, 121) responsive to the contraction of the welds (25a). In FIGS. 11A and 11B, the deformed rotor core (21, 121) is schematically indicated by the long dashed double-short dashed line.

In the first and second embodiments, the step of welding the rotor core (21, 121) involves, as described above, welding the rotor core (21, 121) from the first end (21a) of the rotor core (21, 121) to the second end (21b) of the rotor core (21, 121) in the rotation axis direction. This makes it possible to uniformly weld all of the electromagnetic steel sheets (22) of the rotor core (21, 121). Thus, the rigidity (or mechanical strength) of the rotor core (21, 121) manufactured will be higher than when some of the electromagnetic steel sheets (22) of the rotor core (21, 121) are welded. Uniformly welding all of the electromagnetic steel sheets (22) of the rotor core (21, 121) increases the length of each weld (25a), so that the tensile stress produced in the welds (25a) increases accordingly. In such a case, it is particularly advantageous to reduce the tensile stress produced in the contracted welds (25a) so as to reduce the occurrence of cracks in the welds (25a).

Modifications

The embodiments disclosed herein are to be considered as not limitative but illustrative in all respects. The scope of the present application is defined not by the description of the foregoing embodiments but by the claims, and embraces all modifications and variations that may fall within the scope of the claims and equivalents thereof.

Although the first and second embodiments have been described based on an example where the inner peripheral surface of the rotor core is welded, the present application is not limited to this example. In an alternative example, the outer peripheral surface of the rotor core may be welded.

Although the first embodiment has been described based on an example where the step of securing, with the resin, the magnets inserted into the magnet insertion holes of the rotor core is performed after the step of welding the rotor core, the present application is not limited to this example. In an alternative example, the step of securing, with the resin, the magnets inserted into the magnet insertion holes of the rotor core may be performed before the step of welding the rotor core, as long as the rotor core does not have the minimum thickness.

Although the second embodiment has been described based on an example where the step of securing, with the adhesive, the magnets inserted into the magnet insertion holes of the rotor core is performed before the step of welding the rotor core, the present application is not limited to this example. In an alternative example, the step of securing, with the adhesive, the magnets inserted into the magnet insertion holes of the rotor core may be performed after the step of welding the rotor core.

Although the first and second embodiments have been described based on an example where the step of inserting the magnets into the magnet insertion holes of the rotor core is performed before the step of welding the rotor core, the present application is not limited to this example. In an alternative example, the step of inserting the magnets into the magnet insertion holes of the rotor core may be performed after the step of welding the rotor core.

Although the first and second embodiments have been described based on an example where the rotor core is welded from the first end of the rotor core to the second end of the rotor core in the rotation axis direction, the present invention is not limited to this example. The present invention does not necessarily have to involve welding the rotor core from the first end of the rotor core to the second end of the rotor core in the rotation axis direction. An alternative example may involve partially welding the rotor core between the first end of the rotor core and the second end of the rotor core in the rotation axis direction instead of welding the rotor core from the first end of the rotor core to the second end of the rotor core in the rotation axis direction.

Although the first and second embodiments have been described based on an example where the welding target portions of the rotor core each have a convex shape, the present invention is not limited to this example. The welding target portions of the rotor core according to the present invention may each have any shape other than a convex shape.

Although the first and second embodiments have been described based on an example where the rotary electric machine member manufacturing method according to the present invention is a rotor manufacturing method, the present invention is not limited to this example. The rotary electric machine member manufacturing method according to the present application may be a method for manufacturing a stator including a stator core serving as a motor core. The stator manufacturing method in this case includes the step of providing a stator core by stacking a plurality of electromagnetic steel sheets, and the step of welding the stator core by keyhole welding while pressurizing the stator core in a stacking direction with a welding pressure lower than that at which the thickness of the stator core levels off.

DESCRIPTION OF THE REFERENCE NUMERALS 20, 120 rotor (rotary electric machine member)
21, 121 rotor core (motor core)
21a first end
21b second end
22 electromagnetic steel sheet
24 magnet insertion hole
32 permanent magnet (magnet)

The invention claimed is:

1. A rotary electric machine member manufacturing method comprising:
   a step of providing a motor core by stacking a plurality of electromagnetic steel sheets; and
   a step of welding the motor core by keyhole welding while pressurizing the motor core in a stacking direction with a welding pressure lower than that at which a thickness of the motor core in the stacking direction levels off, the thickness being a length of the motor core between a first end of the motor core and a second end of the motor core, wherein
   the step of welding the motor core involves welding the motor core while pressurizing, with a welding pressure lower than that at which the motor core has a minimum thickness, the motor core having a gap between the electromagnetic steel sheets.

2. The rotary electric machine member manufacturing method according to claim 1, further comprising, after the step of welding the motor core, a step of securing, with resin, a magnet inserted into a magnet insertion hole of the motor core while pressurizing the motor core with a welding pressure at which the motor core has a minimum thickness.

3. The rotary electric machine member manufacturing method according to claim 2, wherein
   the motor core is one of a rotor core and a stator core, and
   the step of welding the motor core that is one of the rotor core and the stator core involves welding the one of the rotor core and the stator core such that the one of the rotor core and the stator core has a thickness at which a density of the one of the rotor core and the stator core is equal to or higher than a density of the other one of the rotor core and the stator core, the other one of the rotor core and the stator core facing the one of the rotor core and the stator core.

4. The rotary electric machine member manufacturing method according to claim 2, further comprising, before the step of welding the motor core, a step of inserting a magnet into a magnet insertion hole of the motor core.

5. The rotary electric machine member manufacturing method according to claim 1, wherein
   the motor core is one of a rotor core and a stator core, and
   the step of welding the motor core that is one of the rotor core and the stator core involves welding the one of the rotor core and the stator core such that the one of the rotor core and the stator core has a thickness at which a density of the one of the rotor core and the stator core is equal to or higher than a density of the other one of the rotor core and the stator core, the other one of the rotor core and the stator core facing the one of the rotor core and the stator core.

6. The rotary electric machine member manufacturing method according to claim 5, wherein
   the motor core is one of a rotor core and a stator core, and
   the step of welding the motor core that is one of the rotor core and the stator core involves welding the one of the rotor core and the stator core such that the one of the rotor core and the stator core has a thickness at which a density of the one of the rotor core and the stator core is equal to or higher than a density of the other one of the rotor core and the stator core, the other one of the rotor core and the stator core facing the one of the rotor core and the stator core.

7. The rotary electric machine member manufacturing method according to claim 5, further comprising, before the step of welding the motor core, a step of inserting a magnet into a magnet insertion hole of the motor core.

8. The rotary electric machine member manufacturing method according to claim 1, wherein
   the motor core is one of a rotor core and a stator core, and
   the step of welding the motor core that is one of the rotor core and the stator core involves welding the one of the rotor core and the stator core such that the one of the rotor core and the stator core has a thickness at which a density of the one of the rotor core and the stator core is equal to or higher than a density of the other one of the rotor core and the stator core, the other one of the rotor core and the stator core facing the one of the rotor core and the stator core.

9. The rotary electric machine member manufacturing method according to claim 1, further comprising, before the step of welding the motor core, a step of inserting a magnet into a magnet insertion hole of the motor core.

10. The rotary electric machine member manufacturing method according to claim 1, wherein
    the step of welding the motor core involves welding the motor core from a first end of the motor core to a second end of the motor core in a rotation axis direction.

11. A rotary electric machine member manufacturing method comprising:
    a step of providing a motor core by stacking a plurality of electromagnetic steel sheets;
    a step of welding the motor core by keyhole welding while pressurizing the motor core in a stacking direction with a welding pressure lower than that at which a thickness of the motor core in the stacking direction levels off, the thickness being a length of the motor core between a first end of the motor core and a second end of the motor core; and
    before the step of welding the motor core, a step of securing, with an adhesive, a magnet inserted into a magnet insertion hole of the motor core while pressurizing the motor core with a welding pressure lower than that at which the motor core has a minimum thickness, the motor core having a gap between the electromagnetic steel sheets.

12. The rotary electric machine member manufacturing method according to claim 11, wherein
    the motor core is one of a rotor core and a stator core, and
    the step of welding the motor core that is one of the rotor core and the stator core involves welding the one of the rotor core and the stator core such that the one of the rotor core and the stator core has a thickness at which a density of the one of the rotor core and the stator core is equal to or higher than a density of the other one of the rotor core and the stator core, the other one of the rotor core and the stator core facing the one of the rotor core and the stator core.

13. The rotary electric machine member manufacturing method according to claim 11, further comprising, before the step of welding the motor core, a step of inserting a magnet into a magnet insertion hole of the motor core.

* * * * *